(12) United States Patent
Arbore et al.

(10) Patent No.: US 7,046,712 B2
(45) Date of Patent: May 16, 2006

(54) LASER RESISTANT TO INTERNAL IR-INDUCED DAMAGE

(75) Inventors: Mark A. Arbore, Los Altos, CA (US); John F. Black, San Mateo, CA (US); William M. Grossman, Los Altos, CA (US)

(73) Assignee: JDS Uniphase Corporation, San Jose, CA (US)

( * ) Notice: Subject to any disclaimer, the term of this patent is extended or adjusted under 35 U.S.C. 154(b) by 325 days.

(21) Appl. No.: 10/429,261

(22) Filed: May 2, 2003

(65) Prior Publication Data

US 2004/0218653 A1   Nov. 4, 2004

(51) Int. Cl.
*H01S 3/094* (2006.01)

(52) U.S. Cl. .............................. 372/75; 372/71; 372/72

(58) Field of Classification Search ............... 372/6, 372/10, 68, 71, 72, 75
See application file for complete search history.

(56) References Cited

U.S. PATENT DOCUMENTS

| | | | | |
|---|---|---|---|---|
| 3,355,674 A * | 11/1967 | Hardy | ............................ | 372/6 |
| 3,609,389 A * | 9/1971 | Bjorkholm | .................... | 372/10 |
| 3,614,662 A * | 10/1971 | Monchamp et al. | .......... | 372/41 |
| 4,039,970 A | 8/1977 | Shiroki et al. | ................. | 372/41 |
| 4,132,962 A * | 1/1979 | Yang et al. | .................... | 372/41 |
| 4,159,686 A * | 7/1979 | Heim | ........................... | 112/222 |
| 4,824,598 A * | 4/1989 | Stokowski | .................... | 372/41 |
| 5,088,103 A * | 2/1992 | Esterowitz et al. | ........... | 372/68 |
| 5,200,972 A * | 4/1993 | Scheps | ......................... | 372/69 |
| 5,285,467 A * | 2/1994 | Scheps | ......................... | 372/69 |
| 5,412,674 A * | 5/1995 | Scheps | ......................... | 372/22 |
| 6,002,704 A | 12/1999 | Freitag et al. | ................. | 372/94 |
| 6,339,605 B1 * | 1/2002 | Vetrovec | ....................... | 372/35 |
| 6,373,863 B1 * | 4/2002 | Ohishi et al. | ................... | 372/6 |
| 2002/0071455 A1* | 6/2002 | Heine | .............................. | 372/6 |
| 2002/0126974 A1* | 9/2002 | Bayart et al. | ................ | 385/127 |

FOREIGN PATENT DOCUMENTS

| | | |
|---|---|---|
| EP | 750800 B1 | 1/1997 |
| EP | 805529 A2 | 11/1997 |
| EP | 855769 A2 | 7/1998 |
| JP | 05048191 | 2/1993 |
| WO | WO 00/023790 | 4/2000 |

OTHER PUBLICATIONS

Characterization and Control of Gamma and Proton Radiation Effects on the Performance of Nd:YAG and Nd:YLF Lasers, by T.S. Rose, M.S. Hopkins and R.A. Fields, in IEEE J. Quan. Elec., vol. 31, No. 9, p. 1593 (1995).

(Continued)

*Primary Examiner*—Minsun Oh Harvey
*Assistant Examiner*—Dung (Michael) T. Nguyen
(74) *Attorney, Agent, or Firm*—Allen, Dyer, Doppelt, Milbrath & Gilchrist, P.A.

(57) ABSTRACT

Co-doping the gain medium of a diode-pumped infrared laser to make the laser resistant to long-term degradation from high-intensity internal infrared radiation is disclosed. Co-doping the gain medium with ions such as $Cr^{3+}$ and $Ce^{3+}$ that make the gain medium resistant to external ionizing radiation solves problems of long-term degradation of the gain medium.

68 Claims, 2 Drawing Sheets

OTHER PUBLICATIONS

Radiation Hardening of Nd:YAG by Transition Metal Ion Codopants by T.S. Rose, R.L. Hutchenson and R. A. Fields, in Proceedings of Advanced Solid State Lasers 1994, Optical Society by America, Paper A AQB2-1, p. 209 (1994).

Effect of chromium ions on the formation of color centers in crystals with the garnet structure, by M. Kh. Ashurov, et al, in Sov. Phys. Dokl. vol. 30, No. 6, p. 490, (1985).

Luminescence of Cr3+ and energy transfer between Cr3+ and Nd3+ ions in yttrium aluminum garnet, by P. Hong, X. X. Zhang, C. W. Struck, and B. Di Bartolo, in J. Appl. Phys., vol. 78, No. 7, p. 4659, (1995).

Transient Colour Centres Caused by UV Light Irradiation in Yttrium Aluminium Garnet Crystals by K. Mori, in Phys. Stat. Sol. (a), vol. 42, p. 375 (1977).

G. Zeidler "Pump-Power Dependent Efficiency in a YAG:Nd$^{3+}$ Laser" in IEEE J. Quan. Elec. vol. 7, pp 1016-1017 (1968).

M. Bass and A. E. Paladino, "Color Centers in Yttrium Gallium Garnet and Yttrium Aluminum Garnet", in Journal of Applied Physics vol. 38, No. 6, pp. 2706-2707, 1967.

1.06-urn absorption caused by stable color centers in flash-lamp-pumped Nd:YAG laser rods by Gerd Phillipps and Joachim Vater, in Applied Optics, vol. 32, No. 18, p. 3210, (1993).

Relationship between formation of radiation color centers and growth defects in Nd:YAG crystals, by N. S. Kovaleva, A. O. Ivanov and E. P. Dubrovina, in Sov. J. Quan. Elec., vol. 11, p. 1485 (1981).

Spectral Filter for a ND:YAIG Pumping Cavity by V. Czarniewski, in Applied Optics, vol. 10, No. 6, p. 1460 (1971).

Shiqun Li et al.: "Self-Q-switched diode-end-pumped Cr,Nd:YAG laser with polarized output" Optics Letters, Bd. 18, Nr. 3, Feb. 1, 1993.

* cited by examiner

LASER RESISTANT TO INTERNAL IR-INDUCED DAMAGE

FIELD OF THE INVENTION

This invention generally relates to lasers and more particularly to making YAG lasers that are resistant to damage from intense internal infrared radiation.

BACKGROUND OF THE INVENTION

Solid state lasers, such as Yttrium Aluminum Garnet (YAG) lasers are subject to different modes of failure. One mode of failure is degradation of the laser over periods of prolonged use. Although relevant to all lasers, this failure mode is particularly relevant to lasers that are in continuous or nearly continuous use over long periods of time, e.g., hundreds or thousands of hours or more. For example, a lifetime of 100–1000 hours means that the laser probably requires regular service, which is acceptable for some applications. Lifetimes of 5000–10,000 hours are typically acceptable for lasers used in manufacturing environments. Some laser applications require even longer lifetimes. Although the existence of such a failure mode is known in the prior art, its nature is unclear and variable due multiple potential problems associated with the complex nature of lasers. Some of these problems are mechanical in nature and some are related to degradation of optical components. Since the nature of the longer-term degradation problem is unclear, so is the solution to the problem. It would be desirable for any solution to the problem to be simple to implement, low-cost, and not require a complete redesign of an existing laser system.

Thus, there is a need in the art, for a solid-state laser that is resistant to long term degradation and method for implementing such a laser.

SUMMARY OF THE INVENTION

Embodiments of the present invention overcome the disadvantages associated with the prior art through the use in a diode-pumped infrared laser of a gain medium co-doped with ions that make the gain medium resistant to ionizing radiation, wherein a peak intensity of internal infrared radiation is greater than about 0.01 Gwatts/cm$^2$ within the gain medium.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Glossary

As used herein:

The article "A", or "An" refers to a quantity of one or more of the item following the article, except where expressly stated otherwise.

Cavity refers to an optical path defined by two or more reflecting surfaces along which light can reciprocate or circulate. Objects that intersect the optical path are said to be within the cavity.

Co-doping refers to doping a gain medium with two or more dopants, e.g., a dopant for lasing and an additional dopant, called a co-dopant.

Continuous wave (CW) laser: A laser that emits radiation continuously rather than in short bursts, as in a pulsed laser.

Cosmic Rays refers to gamma rays, high-energy charged particles, and other high-energy radiation originating in outer space.

Diode Laser refers to a light-emitting diode designed to use stimulated emission to generate a coherent light output. Diode lasers are also known as laser diodes or semiconductor lasers.

Diode-Pumped Laser refers to a laser having a gain medium that is pumped by a diode laser.

Gain Medium refers to a lasable material as described below with respect to Laser.

Garnet refers to a particular class of oxide crystals, including e.g., yttrium aluminum garnet (YAG), gadolinium gallium garnet (GGG), gadolinium scandium gallium garnet (GSGG), yttrium scandium gallium garnet (YSGG) and the like.

Includes, including, e.g., "such as", "for example", etc., "and the like" may, can, could and other similar qualifiers used in conjunction with an item or list of items in a particular category means that the category contains the item or items listed but is not limited to those items.

Infrared Radiation refers to electromagnetic radiation characterized by a vacuum wavelength between about 700 nanometers (nm) and about 5000 nm.

Internal Radiation refers to radiation introduced into or generated within a laser cavity as a cause or result of processes that are meant to occur there or are an intended or unintended consequence of such processes. Internal radiation is not generated unless the gain medium is pumped. Examples of internal radiation include stimulated radiation generated by the lasing process itself, and radiation generated by some frequency conversion process involving the stimulated radiation.

Ionizing Radiation refers to ultraviolet, radiation gamma rays, high-energy charged particles, and other high-energy radiation.

Laser is an acronym of light amplification by stimulated emission of radiation. A laser is a cavity that is filled with lasable material. This is any material—crystal, glass, liquid, dye or gas—the atoms of which are capable of being excited to a metastable state by pumping e.g., by light or an electric discharge. The light emitted by an atom as it drops back to the ground state and emits light by stimulated emission The light (referred to herein as stimulated radiation) is continually increased in intensity as it makes multiple round trips through the cavity. A laser may be constructed using an optical fiber as the gain medium. Fibers are typically glass-type materials, though may be crystalline or glass-nanocrystal composites.

Light: As used herein, the term "light" generally refers to electromagnetic radiation in a range of frequencies running from infrared through the ultraviolet, roughly corresponding to a range of vacuum wavelengths from about 1 nanometer ($10^{-9}$ meters) to about 100 microns.

Mode-Locked Laser refers to a laser that functions by controlling the relative phase (sometimes through modulation with respect to time) of each mode internally to give rise selectively to energy bursts of high peak power and short duration, e.g., in the picosecond ($10^{-12}$ second) domain.

Non-linear effect refers to a class of optical phenomena that can typically be viewed only with nearly monochromatic, directional beams of light, such as those produced by a laser. Harmonic generation (e.g., second-, third-, and fourth-harmonic generation), optical parametric oscillation, sum-frequency generation, difference-frequency generation, optical parametric amplification, and the stimulated Raman effect are examples.

Non-linear material refers to materials that possess a non-zero nonlinear dielectric response to optical radiation that can give rise to non-linear effects. Examples of non-linear materials include crystals of lithium niobate ($LiNbO_3$), lithium triborate (LBO), beta-barium borate (BBO), Cesium Lithium Borate (CLBO), KDP and its isomorphs, $LiO_3$ crystals, as well as quasi-phase-matched materials.

Phase-matching refers to the technique used in a multi-wave nonlinear optical process to enhance the distance over which the coherent transfer of energy between the waves is possible. For example, a three-wave process is said to be phase-matched when $k_1+k_2=k_3$, where $k_i$ is the wave vector of the $i^{th}$ wave participating in the process. In frequency doubling, e.g., the process is most efficient when the fundamental and the second harmonic phase velocities are matched.

Q refers to the figure of merit of a resonator (cavity), defined as $(2\pi)\times$(average energy stored in the resonator)/ (energy dissipated per cycle). The higher the reflectivity of the surfaces of an optical resonator and the lower the absorption losses, the higher the Q and the less energy loss from the desired mode.

Q-switch refers to a device used to rapidly change the Q of an optical resonator.

Q-switched Laser refers to a laser that uses a Q-switch in the laser cavity to prevent lasing action until a high level of inversion (optical gain and energy storage) is achieved in the lasing medium. When the switch rapidly increases the Q of the cavity, e.g., with an acousto-optic or electrooptic modulators or saturable absorbers, a giant pulse is generated.

Quasi-Phasematched (QPM) Material: In a quasi-phase-matched material, the fundamental and higher harmonic radiation are not phasematched, but a QPM grating compensates. In a QPM material, the fundamental and higher harmonic can have identical polarizations, often improving efficiency. Examples of quasi-phasematched materials include periodically-poled lithium tantalate, periodically-poled lithium niobate (PPLN) or PPKTP.

Vacuum Wavelength: The wavelength of electromagnetic radiation is generally a function of the medium in which the wave travels. The vacuum wavelength is the wavelength electromagnetic radiation of a given frequency would have if the radiation were propagating through a vacuum and is given by the speed of light in vacuum divided by the frequency.

Introduction

In general terms, embodiments of the present invention produce damage-resistant diode-pumped lasers. The inventors have been involved in a systematic study of this type of failure mode in lasers that use Neodymium-doped Yttrium Aluminum Garnet (Nd:YAG) as a gain medium. In particular their studies have focused on diode-pumped lasers using $Nd^{3+}$-doped YAG as a gain medium. The inventors believe that their discoveries can be applied to other types of garnet-based lasers and other solid-state lasers as well.

A diode pumped $Nd^{3+}$:YAG laser receives pump light e.g., of about 808 nm, sometimes 880 nm from a diode laser. The pump light stimulates emission of 1064-nm radiation in the $Nd^{3+}$:YAG gain medium. The stimulated 1064-nm radiation travels back and forth between to mirrors in an intense and well-defined beam. The laser may be Q-switched to produce short, intense pulses. Long-term degradation of the laser manifests itself as a slow decrease in output power over time. Initial consultation with the supplier of the gain medium indicated that the supplier did not believe that the problem originated in the gain medium. However, the inventors' observations of long term degradation in Nd:YAG gain media revealed a degradation of the bulk gain medium. Furthermore, the inventors discovered that damage to the gain medium is almost entirely confined to the beam path. The inventors have observed that the amount of damage depends strongly on the intensity of the 1064-nm (infrared) radiation within the Nd:YAG.

The damage is of a type known as color center generation. Color centers absorb the 1064-nm stimulated radiation within the Nd:YAG, thereby reducing the output. The inventors note that intense bombardment by ionizing radiation such as cosmic rays can also cause color center generation. Co-doping the Nd:YAG with Chromium ions, such as $Cr^{3+}$ or Cerium ions, such as $Ce^{3+}$ has been used in experiments to protect diode-pumped lasers from cosmic rays. For example, in "Radiation Hardening of Nd:YAG by Transition Metal Ion Codopants" by T. S. Rose, R. L. Hutchenson and R. A. Fields, in Proceedings of Advanced Solid State Lasers 1994, Optical Society of America, Paper AQB2-1, pg 209 (1994) indicates that degradation of laser performance due to gamma ray irradiation is due entirely to 1064-nm absorption caused by color center formation. The Rose, et al. publication indicates that 0.05% of $Cr^{3+}$ ions makes a measurable improvement in gamma-ray resistance, but that 1% of $Cr^{3+}$ ions is far superior. Rose et al. list alternative approaches to radiation hardening Nd:YAG—including particular ways of designing the laser cavity to be insensitive to small changes in optical loss at 1064 nm (e.g., using high output coupling, using short ND:YAG lengths). Unfortunately, this is contrary to the design constraints of intracavity tripled lasers, where it is desirable to make the laser cavity low in loss, and therefore highly sensitive to small changes in optical loss. The reference also describes some of the co-dopants that do NOT work. Furthermore, in these prior art experiments, the intensity of the infrared radiation in the gain medium was substantially less than that for which the inventors have observed long term degradation in Nd:YAG.

Furthermore, an article titled "Effect of chromium ions on the formation of color centers in crystals with the garnet structure", by M. Kh. Ashurov, et al, in Sov. Phys. Dokl. Vol 30, no. 6, pg 490, (1985) shows that $Cr^{3+}$ co-doping prevents color-center damage from occurring in Nd:YAG exposed to gamma rays. This article also shows that $Cr^{3+}$ has a similar effect in many garnet-type crystals, including GGG, GSGG, YSGG. Also, this paper states that the addition of Cerium is a well-known method of making materials resistant to ionizing radiation.

Doping of YAG with both $Cr^{3+}$ and $Nd^{3+}$ ions is typically done for reasons other than radiation hardening. For example, an article titled "Luminescence of Cr3+ and energy transfer between $Cr^{3+}$ and $Nd^{3+}$ ions in yttrium aluminum garnet", by P. Hong, X. X. Zhang, C. W. Struck, and B. Di Bartolo, in J. Appl. Phys., vol 78, no. 7, pg 4659, (1995) describes the absorption and emission properties of $Cr^{3+}$, $Nd^{3+}$, and $Cr^{3+}/Nd^{3+}$ co-doped YAG, in particular the increased absorption of flashlamp radiation and energy transfer from $Cr^{3+}$ to $Nd^{3+}$. This is the traditional reason to use $Cr^{3+}/Nd^{3+}$ co-doped YAG, and has nothing to do with radiation-hardening. Flashlamp pumping radiation is necessarily broad-band, and typically contains significant power at much shorter wavelengths than diode pumping radiation.

The scientific paper "Relationship between formation of radiation color centers and growth defects in Nd:YAG crystals", by N. S. Kovaleva, A. O. Ivanov and E. P. Dubrovina, in Sov. J. Quan. Elec., vol 11, pg. 1485 (1981) describes the correlation between gamma-ray-induced color-center formation and the density of crystal defects in Nd:YAG. This paper also indicates that the color centers can be removed by annealing at 500 degrees Celsius for 2 hours. It also describes how Cerium 3+ doping dramatically reduces color center generation in Nd:YAG.

Color center generation is also a problem in flash lamp pumped lasers, where the problem is known as "solarization." It is believed that solarization is caused by 2-photon Ultraviolet (UV) process. In the prior art, flash lamp pumped lasers have been protected from solarization by placing a filter between the flash lamp and the gain medium. The inventors are not aware of any prior art suggesting that the color center generation due to solarization and color center generation due to ionizing radiation are related in any way.

For example, an article titled "Transient Colour Centres Caused by UV Light Irradiation in Yttrium Aluminium Garnet Crystals" by K. Mori, in Phys. Stat. Sol. (a), vol 42, pg. 375 (1977) describes the transient nature of the "well known" color center absorption induced in YAG by UV light irradiation. The color centers are blamed on crystal defects.

An early scientific paper by G. Zeidler in IEEE J. Quan. Elec. vol 7, pg 153 (1968) reported a reduction in efficiency of a Nd:YAG laser caused by irradiation by highly intense UV and visible radiation, especially at wavelengths shorter than 500 nm. The problem was attributed to absorptive color center generation.

A scientific article entitled "Color Centers in Yttrium Gallium Garnet and Yttrium Aluminum Garnet" by M. Bass and A. E. Paladino, in the late 1960's describes the absorption spectrum (peaked in the near UV, with a broad tail extending through the visible and weakly into the IR) associated with color centers in YAG. This paper also suggests that it is UV light that causes color center generation, and that it can be prevented (or reduced/slowed) by placing a filter between the flashlamps and the YAG. For example, U.S. Pat. No. 4,039,970 describes a YAG laser containing a filter to block light of wavelengths less than 500 nm from entering the YAG crystal so that improved performance is obtained. In addition, a scientific paper titled "Spectral Filter for a Nd:YA1G Pumping Cavity" by V. Czarniewski, in Applied Optics, Vol 10, no. 6, pg. 1460 (1971) describes the use of a spectral filter placed between the flashlamp and the Nd:YAG rod to absorb UV light and prevent it from damaging the Nd:YAG crystal. The data indicates that a 10 minutes exposure to flashlamp radiation can cause degradation.

Some of the prior art also suggests that color center generation is associated with impurities, which would tend to suggest that co-doping would not solve the problem. For example, another paper entitled "1.06-um absorption caused by stable color centers in flash-lamp-pumped Nd:YAG laser rods" by Gerd Phillipps and Joachim Vater, in Applied Optics, Vol 32, No 18, pg. 3210, (1993) reviews much of the knowledge about "solarization" of Nd:YAG, again pointing out that it is well known that solarization is caused by UV irradiation. This paper also distinguishes between stable (long term) and unstable (short lifetime) color centers, indicates that 10 ppm levels of many impurities have been implicated as the cause of color centers, and also quantifies the magnitude of typical 1064-nm absorption that can be created by UV irradiation of Nd:YAG. Their data shows a saturation of about 0.004 $cm^{-1}$ absorption for a particular flashlamp pumping condition. This corresponds to very roughly 1% round-trip loss in a typical Nd:YAG laser. This paper attempts to quantify the relative significance of (a) creation of both stable and unstable color centers UV irradiation and (b) annihilation of unstable color centers by UV irradiation.

All of the prior art suggests that it is short wavelength radiation, e.g., UV or ionizing radiation, e.g., gamma rays, etc., that causes degradation of the gain medium by color center generation. None of the references pertaining to solarization suggest that co-doping with $Cr^{3+}$ or $Ce^{3+}$ will solve the solarization problem. Internal infrared radiation in YAG lasers is much longer in wavelength and, therefore, less energetic. For this reason, infrared radiation has not generally been regarded as ionizing radiation. Furthermore, it is known that doping YAG with $Cr^{4+}$ can cause strong absorption of infrared radiation, which would defeat the purpose of an infrared laser. Out of fear of introducing unintended $Cr^{4+}$, the inventors were themselves reluctant to try $Cr^{3+}$ co-doped $Nd^{3+}$:YAG.

Solution to the Problem

Given the inventors discovery that the amount of damage due to color center generation from internal 1064-nm radiation depends strongly on the intensity of the 1064-nm (infrared) radiation within the Nd:YAG it is postulated that the source of long-term degradation in Nd:YAG and the solution to this problem are follows.

(1) A laser cavity with relatively low losses can have high average circulating powers, e.g., hundreds of Watts. In one example of a low-loss cavity, there is no intentional output coupling other than nonlinear optical conversion to second and third harmonic wavelengths, e.g., using low-nonlinearity LBO crystals.

(2) If the laser is Q-switched the intracavity peak power increases further. For example 50 nsec pulses, separated by 50 microseconds (20 kHz)—result in a 1000:1 enhancement between peak power and average power—thereby resulting in intracavity peak powers of hundreds of kW.

(3) The laser mode is focused tightly (<<1 square mm) into the Nd:YAG rod, resulting in peak IR (infrared) intensities on the order of 0.01–1 GWatt per square cm.

(4) The inventors reasoned that these high IR intensities enable a slow, but non-zero, rate of multi-photon (probably 6 or 7 photon) absorption from the YAG valence band to the YAG conduction band.

(5) The inventors further reasoned that absorbed light (and therefore the liberated electrons/holes) is equivalent (as far as the YAG is concerned) to more easily absorbed UV light. Hence, any type of crystal damage ("solarization") that absorbed UV light can cause will also be caused by multi-photon-absorbed IR light.

(6) The inventors concluded that YAG is therefore "solarized" by the high intensity IR light, albeit very slowly because of the low probability of multi-photon absorption of IR light. This generates color centers which exhibit a small amount of (linear) absorption at 1064 nm.

(7) This 1064-nm absorption, while small in magnitude, is more important to a long Nd:YAG rod (or slab) inside a low-loss cavity that must be operated for thousands of hours without adjustment.

(8) Similar or identical color centers in YAG are also caused by gamma-ray irradiation. The similarities are (a) both are radiation-induced, and (b) both have the same absorption spectrum—peaked in the near-UV, with a long tail extending to the IR.

(9) It has been shown in the literature that $Cr^{3+}$ or $Ce^{3+}$ co-doping effectively reduces the color-center generation in gamma-ray irradiated YAG.

(10) It is well known that $Cr^{3+}$ co-doping does not significantly affect the background losses of a Nd:YAG crystal.

Hence, the inventors reasoned that $Cr^{3+}$ or $Ce^{3+}$ co-doping could effectively reduce multi-IR-photon-absorption-induce degradation of YAG due to high intensity (e.g., 0.01 giga-watt per square centimeter ($GWatt/cm^2$) and above) internal radiation.

By way of contrast, Rose, et al state that they measured the 1.06 um absorption coefficient of radiation-damaged Nd:YAG at intensities up to 900 $MW/cm^2$. However, they did not build lasers with Nd:YAG experiencing these intensities. They were looking for nonlinear absorption (i.e. multi-photon absorption or saturating absorption, giving absorption which depends on intensity) and DID NOT OBSERVE ANY, even for crystals that had been irradiated and had color-center absorption sites. From the results of their experiment, Rose et al. would have concluded that multi-photon absorption at 1.06-um does not happen. Furthermore, Rose et al. did not describe (and presumably did not build) a laser with a co-doped Cr:Nd:YAG gain medium subject to infrared intensities in the range of 0.01 GWatt per square cm and above.

Experiments

By experimenting with YAG lasers doped with $Cr^{3+}$ ions the inventors discovered that $Cr^{3+}$ or $Ce^{3+}$ co-doping does, in fact, effectively reduce multi-IR-photon-absorption-induced degradation of YAG due to high intensity (e.g., 0.01 $GWatt/cm^2$ and above) internal radiation. First, the 1064-nm absorption of Nd:YAG crystals was measured before and after exposure to ~100 $MW/cm^2$ intensity, pulsed 1064 nm light intra-cavity to a laser. Before exposure, the Nd:YAG absorbed 35 ppm/cm. After exposure to approximately $10^{11}$ pulses of laser operation, the Nd:YAG absorbed 600 ppm/cm in the region of the crystal where the IR beam was present.

A second experiment compared the 1064-nm absorption of unexposed Nd:YAG and Cr:Nd:YAG. As before, the Nd:YAG absorbed 35 ppm/cm, while the Cr:Nd:YAG absorbed 100 ppm/cm. The higher absorption would ordinarily motivate a practitioner in the art of laser design to avoid the use of co-doped Cr:Nd:YAG, especially in a low-loss, low-noise, intra-cavity frequency converted laser.

In order to demonstrate that, despite the increased initial absorption coefficient, the Cr:Nd:YAG would outperform normal Nd:YAG after extended operation inside a laser, two nearly-identical lasers were built—differing only in that one contained Cr as a co-dopant while the other did not. The Cr:Nd:YAG laser is described below:

An intra-cavity tripled, side-pumped, Cr:Nd:YAG rod laser was also built to demonstrate the immunity to internally generated radiation. The YAG rod was doped with 1% Nd (typical for Nd:YAG lasers) and 0.5% $Cr^{3+}$ (a convenient amount). The rod had Brewster angled surfaces polished onto the two ends, thereby ensuring polarized output and minimizing reflective losses (See U.S. Pat. Nos. 5,867,324 and 5,774,488, which describe this geometry and which are incorporated herein by reference). The rod was side-pumped using three 808-nm diode lasers operating at about 25 Watts of power, each. The cavity contained an acousto-optic modulator for active Q-switching, two LBO crystals, a focusing mirror for producing a small spot inside the LBO crystals, and a pair of end mirrors. One LBO crystal was configured (by selecting orientation and polarizations) for second-harmonic generation (SHG) (1064 nm+1064 nm=532 nm), while the other was configured for third-harmonic generation (THG) (1064 nm+532 nm=355 nm). The THG crystal had an uncoated, dispersive, Brewster-angled output facet. (See U.S. Pat. No. 5,850,407, which is incorporated herein by reference.) The end mirror closest to the SHG crystal was reflective for both the 1064 nm and the 532 nm wavelengths.

The cavity was a standing-wave cavity, so each optical component (other than the end mirrors) was traversed twice per round trip. This doubles the unsaturated gain from the laser medium, doubles the hold-off of the Q-switch, and doubles the effective length of the LBO crystal configured for SHG. The THG crystal does not experience an effective doubling of length because it can only generate 355-nm light when both 1064-nm and 532-nm light are present.

The laser was aligned to produce the highest possible average UV power, while maintaining a high beam quality. This alignment condition corresponds to minimal total losses, optimal phasematching, etc. The laser performance (UV average power, pulsewidth, etc . . . ) was measured before the laser operated for any significant period of time. In order to observe rapid degradation due to multi-photon IR absorption, the laser was operated with approximately 200 $MW/cm^2$ of circulating peak IR power inside the laser cavity. The laser performance was re-characterized after about $10^{10}$ pulses of laser operation.

A second laser (identical to the first except that it lacked the Cr co-dopant) was built, operated, and characterized under identical conditions. The results of these experiments are summarized in the table below:

| Laser Gain Material | Initial UV Pulse Energy (μJoules) | Initial UV Pulse-width (ns) | Final UV Pulse Energy (μJoules) | Final UV Pulse-width (ns) |
|---|---|---|---|---|
| Nd:YAG (1%) | 79 | 158 | 53 | 140 |
| Cr:Nd:YAG (0.5%/1%) | 73 | 145 | 73 | 146 |

Note that the laser built using a Nd:YAG crystal lost 33% of its UV pulse energy, and the pulse width shortened by 12%. Both changes are indicators of increased loss in the laser cavity. Also note that the laser built using a Nd:Cr:YAG crystal lost no UV pulse energy, and the pulse width did not shorten. Hence, the Nd:Cr:YAG crystal did not degrade during this high-intensity test.

DETAILED DESCRIPTION OF THE DRAWINGS

Figure 1:
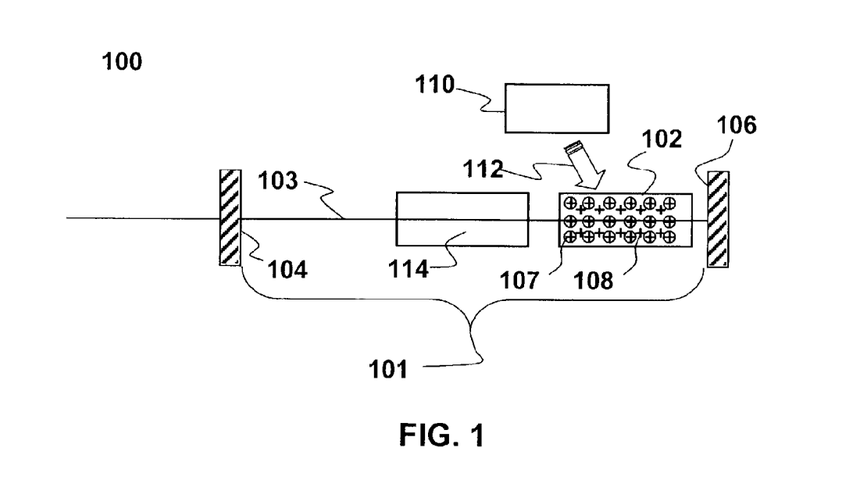
FIG. 1 shows a schematic diagram of a laser according to an embodiment of the present invention.

FIG. 1, and FIGS. 1, 2, and 3A–3B depict examples of lasers according to embodiments of the present invention. FIG. 1 shows a laser 100, having a gain medium 102 disposed within a cavity 101 defined by reflecting surfaces 104, 106. The gain medium 102 may be doped with dopant ions 107 that provide a metastable state for lasing. The gain medium 102 is co-doped with co-dopant ions 108 that make the gain medium 102 resistant to cosmic rays. As the inventors have discovered, this makes the gain medium 102 resistant to high-intensity internal radiation, such as infrared radiation, generated within the cavity 101 by the gain medium 102 itself. The concentration of the co-dopant ions 108 in the gain medium 102 is sufficient to reduce a rate of degradation of the gain medium 102 resulting from infrared radiation, preferably by a factor two or more, (more preferably 10 or more even more preferably 100 or more), compared to the same or a substantially similar gain medium without the co-dopant ions.

The cavity 101 is configured to support electromagnetic radiation 103, e.g., stimulated radiation from the gain medium 102, characterized by a frequency ω chosen such that the radiation 103 falls within the infrared portion of the electromagnetic spectrum. In a preferred embodiment, the fundamental frequency ω corresponds to a vacuum wavelength of about 1064 nm. In alternative embodiments, the fundamental frequency ω can correspond to a vacuum wavelength of about 946 nm or 1319 nm. The cavity 101 may be configured, e.g., by choosing the dimensions (e.g. radii), reflectivities and spacing of the reflectors 104, 106 such that the cavity 101 is a resonator capable of supporting radiation of the fundamental frequency ω. Although a linear cavity 101, having two reflecting surfaces is depicted in FIG. 1, those of skill in the art will be able to devise other cavities, e.g., having stable, unstable, 3-mirror, 4-mirror Z-shaped, 5-mirror W-shaped, cavities with more legs, ring-shaped, or bowtie configurations being but a few of many possible examples.

The gain medium 102 is preferably a solid-state material, such as a crystalline material or a glass. The gain medium 102 can have a length of between about 1 mm and about 200 mm if it is crystalline or bulk glass in nature. If the gain medium is a fiber, then it is typically much longer, from about 0.1 meters to several hundred meters. Preferable crystalline materials include oxides and fluoride crystals, such as yttrium lithium fluoride (YLF). Oxide crystals include YALO (YAlO$_3$), yttrium orthovanadate (YVO$_4$) and garnets. Suitable garnets include yttrium aluminum garnet (YAG), gadolinium gallium garnet (GGG), gadolinium scandium gallium garnet (GSGG), and yttrium scandium gallium garnet (YSGG). A preferred garnet is YAG, which can be doped with different ions. Preferred doped YAG crystals include Tm:Ho:YAG, Yb:YAG, Er:YAG and Nd:YAG, Nd:YVO$_4$ and Nd:YALO. Crystalline gain media containing suitable co-dopant ions can be fabricated by introducing the co-dopant into the melt as the crystal is being grown. This is often implemented using the well-known Czochralski growth method.

The gain medium 102 is most preferably Yttrium Aluminum Garnet doped with Nd$^{3+}$ dopant ions 107 (Nd$^{3+}$:YAG) and the co-dopant ions 108 are preferably Cr$^{3+}$ or Ce$^{3+}$ ions. As described above, Cr$^{3+}$ ions make the Nd$^{3+}$:YAG resistant to ionizing radiation and, as demonstrated above, also make it resistant to high-intensity internal infrared radiation. Alternatively, Ce$^{3+}$ ions may be used instead of Cr$^{3+}$ ions. The Nd$^{3+}$ doping level can be between about 0.05% and about 1.5%, typically about 0.5% to about 1%. The Cr$^{3+}$ co-doping level can be between about 0.01% and about 5%, e.g., between about 0.5% and about 1%. The experiments of the inventors have indicated that 0.5% of Cr$^{3+}$ ions makes a dramatic improvement. Therefore, the most preferred concentration range of Cr$^{3+}$ ions is about 0.5% to about 1%. However, it is expected that concentrations of Cr$^{3+}$ ions below 0.05% will provide some benefit, which may be adequate for some applications. For example, concentrations of Cr$^{3+}$ ions of 0.01% or more are expected to provide some benefit regarding resistance to internal infrared radiation.

By way of example, the gain medium 102 may be a Nd-YAG Brewster rod having a 1% Nd-dopant level and a 0.5% Cr$^{3+}$-dopant level. When co-doping with Cr$^{3+}$ it is desirable to avoid introducing infrared-absorbing Cr$^{4+}$ ions into the gain medium 102. Nd$^{3+}$:YAG produces stimulated emission at vacuum wavelengths of about 946 nm, about 1064 nm, and about 1319 nm, among others. Other suitable gain media include, those listed above, which may be of various shapes and sizes and with higher or lower co-dopant levels. Cr$^{3+}$:Nd:YAG and other gain media are commercially available, e.g., from Scientific Materials Corporation of Bozeman, Mont.

The gain medium 102 may have two end surfaces through which the fundamental radiation 103 passes. The end surfaces of the gain medium 102 may be normal (perpendicular) or near normal to the direction of propagation of the fundamental radiation 103 as shown in FIG. 1. Alternatively, the end surfaces may be situated at a Brewster's angle $\theta_B$ relative to the fundamental radiation 103, such that the fundamental radiation 103 is p-polarized with respect to the end surfaces, i.e. polarized in the plane of the plane of incidence of the fundamental radiation 103. Alternatively, end surfaces may be polished at some other angle.

The gain medium 102 may be pumped (e.g., end-pumped or side-pumped) by an external source 110 of pumping energy 112. An interaction between the pumping energy 112 and the gain medium 102 produces the radiation 103. As such, the radiation 103 is, at least initially, internal radiation. The pumping energy 112 may be in the form of radiation introduced through one or more sides and/or ends of the gain medium 102. In a preferred embodiment, the external source 110 is a diode laser, in which case the laser 100 would be a diode-pumped laser. The pumping radiation 112 can have a vacuum wavelength ranging from about 650 nm to about 1550 nm. For Nd:YAG, the pumping radiation is typically at a vacuum wavelength of about 808 nm or about 880 nm.

The laser 100 may optionally include a pulsing mechanism 114 that facilitates generation of high-intensity radiation pulses (e.g. a Q-switch, a modelocker, passive saturable absorber, a gain control device or some combination thereof). In particular embodiments the pulsing mechanism is a Q-switch. The Q-switch may be an active Q-switch (e.g., using an electro-optic or acousto-optic modulator), or a passive Q-switch (e.g., using a saturable absorber). The use of such a pulsing mechanism can provide very high peak intensities of the radiation 103, which can cause the type of color-center generation described above. In a preferred embodiment, the laser 100 is configured such that the radiation 103 has a peak intensity in the gain medium 102 of greater than about 0.01 GWatt/cm² and not so great as to cause catastrophic damage to the laser 100, e.g. between about 0.01 GWatt/cm² and about 10 GWatt/cm². The level of co-dopant ions 108 in the gain medium should be sufficient to suppress color center generation due to infrared fundamental radiation 103 over the expected useful life of the laser. A useful measure of sufficient suppression of color generation is a less than 10% reduction in power in the radiation 103 over a given useful life, e.g., greater than about 100 hours, preferably greater than about 1000 hours, more preferably greater than about 5000 hours and most preferably greater than about 10,000 hours. An alternative measure is the number of pulses of high intensity radiation the gain medium 102 can endure before a 10% reduction in output power of the laser 100.

Some embodiments of the invention are particularly useful in lasers that are particularly sensitive to loss, such as lasers configured to have low noise, e.g., less than about 10% rms variation pulse-to-pulse. Specifically, for the laser 100 to have low noise it is desirable to pump the gain medium 102 far above the threshold for stimulated emission. Low losses (e.g., less than about 10% round-trip) within the laser 100 keep the threshold low. Such low losses include low output coupling of the cavity 101. For example, one of the reflecting surfaces 104, 106 may transmit a portion of the radiation incident upon it from within the cavity 101. The percentage of radiation transmitted in this way is one possible measure of the output coupling of the cavity 101. Low loss and low output coupling (e.g., less than about 10%) lead to high circulating intensities within the cavity 101 and the gain medium 102, which can lead to long-term degradation as described above. If the gain of the laser 100 is sufficiently high (as is the case for low-pulse-repetition-rates with Nd:YAG and for certain other gain materials such as Nd:YVO4) then an output coupling higher than 10% could still be considered as "low output coupling". In these cases, a more useful definition of "low output coupling" is that the laser can operate at more than 5 times the threshold pump intensity at some condition within the laser's operating parameter range. Therefore it is desirable to dope the gain media of low-loss or low noise lasers with $Cr^{3+}$ or $Ce^{3+}$ ions to inhibit this long-term degradation.

Other variations on the laser of FIG. 1 include lasers that contain more than one section of gain material, more than one type of gain material, use non-linear materials. Non-linear materials may be used in conjunction with frequency conversion, e.g., generation of higher or lower harmonics of the fundamental radiation produced by a gain medium. Examples which are of particular interest include frequency tripled lasers.

Figure 2:
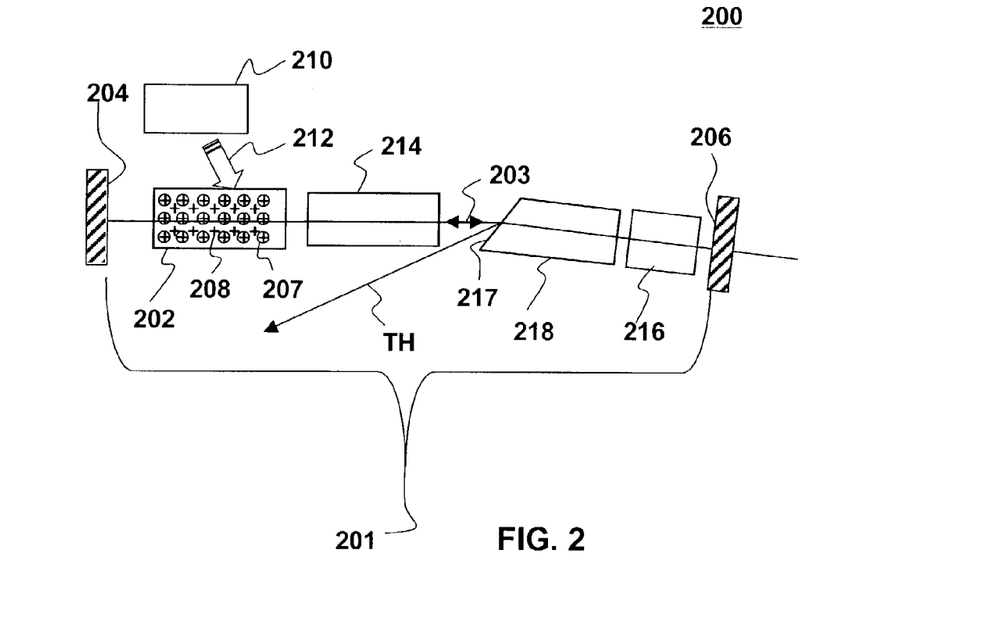
FIG. 2 shows a schematic diagram of an intracavity-frequency tripled diode-pumped, laser according to an alternative embodiment of the present invention.

FIG. 2 depicts a schematic diagram of an intracavity frequency-tripled laser 200 according to an embodiment of the present invention. The laser 200 includes a gain medium 202 and pulsing mechanism 214 disposed within a cavity 201 defined by reflecting surfaces 204, 206. The gain medium 202 includes dopant ions 207 that provide a metastable state and is co-doped with co-dopant ions 208 that make the gain medium resistant to ionizing radiation. As the inventors have discovered, this makes the gain medium 202 resistant to high-intensity internal radiation generated within the cavity 201. The cavity 201, gain medium 202, reflecting surfaces 204, 206, ions 208, and pulsing mechanism 214 may be as described above with respect to the corresponding components in laser 100 of FIG. 1. The laser 200 may further include a source 210 of pump radiation 212, which may be as described above.

The pump radiation 212 stimulates emission by the gain medium 202 of fundamental radiation 203 having frequency ω, corresponding e.g., to a wavelength of about 1064 nm. The laser 200 further includes first and second non-linear elements 216, 218, e.g., non-linear crystals such as LBO, disposed within the cavity 201. The first non-linear element 216 is phase-matched for second harmonic generation, which produces radiation of frequency 2ω, corresponding, e.g., to a wavelength of about 532 nm. The second non-linear element 218 is phase-matched for sum frequency generation between the fundamental radiation and the second harmonic radiation to produce third harmonic radiation TH of frequency 3ω, corresponding, e.g., to a wavelength of about 355 nm. The second non-linear element 218 may include a Brewster-cut face 217. Third harmonic radiation TH emerging from the second non-linear element through the Brewster-cut face 217 refracts out of the cavity 201 as output radiation from the laser. Fundamental radiation 203 remains within the cavity 201.

Frequency-tripled lasers of the type shown in FIG. 2 are described in detail, e.g., in commonly-assigned U.S. Pat. No. 5,850,407, which is incorporated herein by reference.

In the laser of FIG. 2, the frequency tripling occurs within the laser. Alternatively, a frequency-tripled laser may be made using a laser of the type shown in FIG. 1 with the frequency tripling occurring outside the laser cavity. Examples of such lasers are depicted in FIG. 3A and FIG. 3B.

Figure 3A:
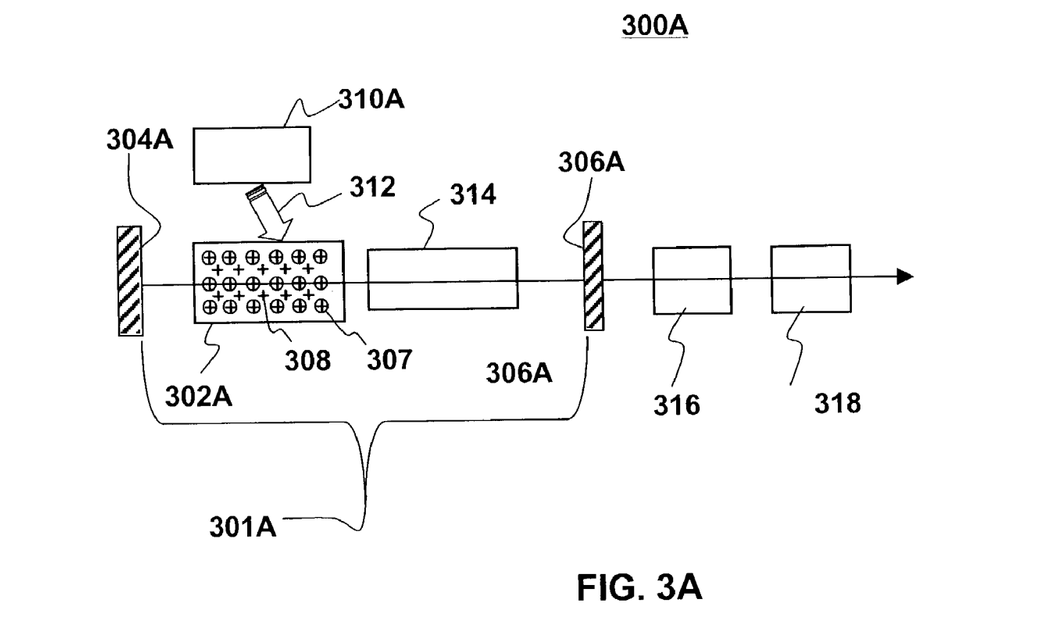
FIGS. 3A–3B depict schematic diagrams illustrating extracavity-frequency tripled diode-pumped lasers according to other alternative embodiments of the present invention.

FIG. 3A depicts an externally frequency-tripled laser 300A having a gain medium 302A and pulsing mechanism 314 disposed within a cavity 301A defined by reflecting surfaces 304A, 306B. The gain medium 302A includes dopant ions 307 and is co-doped with co-dopant ions 308 that make the gain medium resistant to ionizing radiation as described above. The cavity 301, gain medium 302, reflecting surfaces 304A, 306B, ions 308, and pulsing mechanism 314 may be as described above with respect to the corresponding components in laser 100 of FIG. 1. The laser 300A may further include a source 310A of pump radiation 312, which may be a diode laser as described above.

One of the reflecting surfaces, e.g. surface 306B, is partially (e.g., about 50% to about 99%) reflecting with respect to and serves as an output coupler. The laser 300A further includes first and second non-linear elements 316 318 disposed outside the cavity. The first and second non-linear elements are phase-matched as described above to produce third-harmonic radiation TH from the stimulated radiation from the gain medium 302A that emerges from the output coupler 306A. Because of the external configuration of the non-linear crystals 316, 318, they need not have Brewster-cut faces. The ultra-low loss of a Brewster face is not as important, though still of some value, with respect to wavelength separation. A higher intensity in e.g., LBO is required for higher conversion efficiency (e.g., greater than about 20%). Thus, focusing into LBO or short pulses with high intracavity intensities may be needed.

Figure 3B:
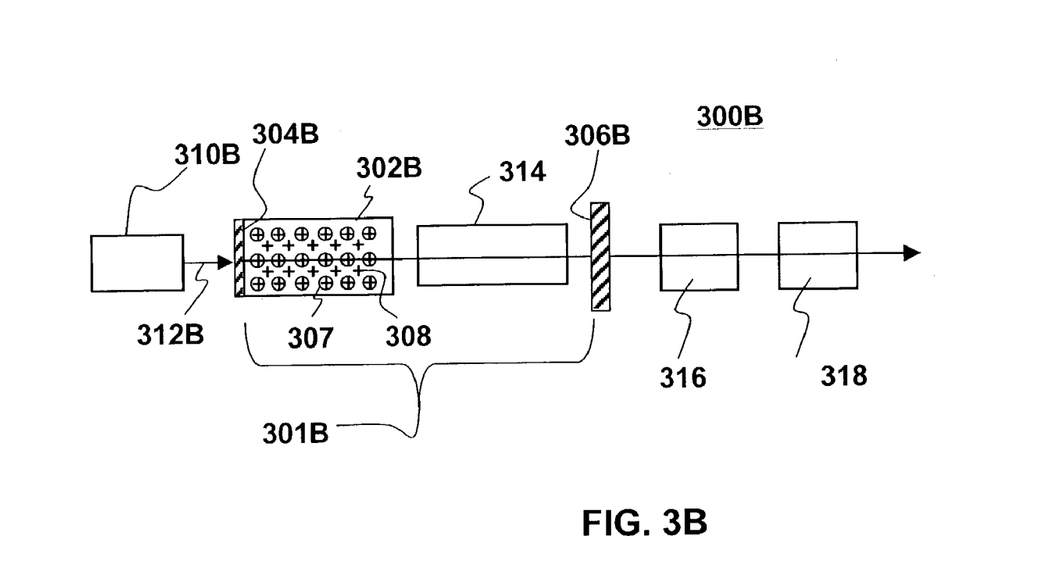

FIG. 3B depicts another frequency tripled laser 300B, which is a variation on the laser of FIG. 3A. Like laser 300A, laser 300B has a gain medium 302B and pulsing mechanism 314 disposed within a cavity 301B defined by reflecting surfaces 304B, 306B. The gain medium 302B includes dopant ions 307 and co-dopant ions 308 as described above. The laser 300B further includes a source 310B of pump radiation 312, which may be a diode laser as described above. The laser 300B also includes first and second non-linear elements configured for frequency tripling of stimulated emission from the gain medium 302B that emerges from the output coupler 306B. Like laser 300A, one of the reflecting surfaces (306B) serves as an output coupler. Unlike the laser 300A, the other reflecting surface 304B also serves as an input coupler for the pumping radiation 312. When used as an input coupler, the reflecting surface 304B is transmissive to the pump radiation 312 and reflective to stimulated emission from the gain medium 302B. The reflecting surface/input coupler 304B may also coincide with one of the end faces of the gain medium 302B.

Embodiments of the present invention may also be extended to the use of co-dopant ions in gain media used in optical equipment other than lasers. For example, Gain media used in optical amplifiers can benefit from co-doping with ions that make the gain medium resistant to ionizing radiation. An optical amplifier is similar to a laser in that it uses a gain medium driven by pumping radiation. The amplifier generally lacks feedback (i.e. a cavity), so that it has gain but does not oscillate.

Embodiments of the present invention allow for longer useful lifetimes of commonly available high intensity lasers without having to completely re-engineer an existing design. Thus, a whole new class of long lifetime lasers can be made commercially available without compromising other performance parameters.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. The appended claims are not to be interpreted as including means-plus-function limitations, unless such a limitation is explicitly recited in a given claim using the phrase "means for."

What is claimed is:

1. A diode pumped laser, comprising
a cavity defined by two or more reflecting surfaces; and
a gain medium disposed within the cavity,
wherein a peak intensity of internal infrared radiation within the gain medium is greater than about 0.01 Gwatts/cm$^2$,
wherein the gain medium contains co-dopant ions that make the gain medium resistant to ionizing radiation,
whereby the gain medium is resistant to damage from the infrared radiation.

2. The laser of claim 1 wherein the concentration in the gain medium of the co-dopant ions is sufficient to reduce a rate of degradation of the gain medium from infrared radiation by a factor two or more compared to the same or a substantially similar gain medium without the co-dopant ions.

3. The laser of claim 1 wherein the gain medium is a solid-state material.

4. The laser of claim 1 wherein the gain medium is a fiber, whereby the laser is a fiber laser.

5. The laser of claim 1 wherein the solid-state material is a crystalline material.

6. The laser of claim 1 wherein the gain medium is a fluoride crystal or an oxide crystal.

7. The laser of claim 1 wherein the gain medium is a garnet.

8. The laser of claim 1 wherein the gain medium is selected from the group of yttrium aluminum garnet (YAG), gadolinium gallium garnet (GGG), gadolinium scandium gallium garnet (GSGG), and yttrium scandium gallium garnet (YSGG).

9. The laser of claim 1, wherein the gain medium is YAG.

10. The laser of claim 1 wherein the gain medium is Tm:Ho:YAG, Yb:YAG, Nd:YAG or Er:YAG.

11. The laser of claim 1 wherein the gain medium is Nd:YVO4 or Nd:YALO.

12. The laser of claim 1 wherein the gain medium is Nd:YAG.

13. The laser of claim 12 wherein the co-dopant ions are $Cr^{3+}$ ions or $Ce^{3+}$ ions.

14. The laser of claim 13 wherein the co-dopant ions are present in the gain medium at a doping level of between about 0.01% and about 5%.

15. The laser of claim 14 wherein the co-dopant ions are present in the gain medium at a doping level of between about 0.5% and about 1%.

16. The laser of claim 1 further comprising a Q-switch disposed within the cavity.

17. The laser of claim 16 wherein the laser is a low-noise Q-switched laser.

18. The laser of claim 16 wherein the laser is an actively Q-switched laser.

19. The laser of claim 1, further comprising means, disposed within the cavity, for frequency conversion of stimulated radiation from the gain medium.

20. The laser of claim 19 wherein the means for frequency conversion generates higher harmonics of the stimulated radiation.

21. The laser of claim 1 wherein the laser is a frequency-tripled laser.

22. The laser of claim 1 wherein the laser is configured to have low noise.

23. The laser of claim 1 wherein the laser can operate at more than about 5 times a threshold pump intensity.

24. The laser of claim 1 wherein the peak intensity of internal infrared radiation within the gain medium is greater than about 0.1 Gwatts/cm$^2$.

25. A method for making a laser gain medium resistant to damage induced by internal infrared radiation, the method comprising:
co-doping the gain medium with ions that make the gain medium resistant to ionizing radiation,
wherein the ions are present in the gain medium in a level sufficient to make the gain medium resistant to long-term degradation due to internal infrared radiation greater than about 0.01 GWatts/cm$^2$ in peak intensity.

26. The method of claim 25 wherein the concentration in the gain medium of the co-dopant ions is sufficient to reduce a rate of degradation of the gain medium from infrared radiation by a factor two or more compared to the same or a substantially similar gain medium without the co-dopant ions.

27. The method of claim 25 wherein the gain medium is a solid-state material.

28. The method of claim 25 wherein the gain medium is a fiber.

29. The method of claim 25 wherein the solid-state material is a crystalline material.

30. The method of claim 25 wherein the gain medium is a fluoride crystal or an oxide crystal.

31. The method of claim 25 wherein the gain medium is a garnet.

32. The method of claim 25 wherein the gain medium is selected from the group of yttrium aluminum garnet (YAG), gadolinium gallium garnet (GGG), gadolinium scandium gallium garnet (GSGG), and yttrium scandium gallium garnet (YSGG).

33. The method of claim 25, wherein the gain medium is YAG.

34. The method of claim 25 wherein the gain medium is Tm:Ho:YAG, Yb:YAG, Nd:YAG or Er:YAG.

35. The method of claim 25 wherein the gain medium is Nd:YVO$_4$ or Nd:YALO.

36. The method of claim 25 wherein the gain medium is Nd:YAG.

37. The method of claim 36 wherein the ions are $Cr^{3+}$ ions or $Ce^{3+}$ ions.

38. The method of claim 37 wherein the ions are present in the gain medium at a doping level of between about 0.01% and about 5%.

39. The method of claim 38 The laser of claim 13 wherein the co-dopant ions are present in the gain medium at a doping level of between about 0.5% and about 1%.

40. The method of claim 25 wherein the peak intensity of internal infrared radiation within the gain medium is greater than about 0.01 GWatts/cm$^2$.

41. A method for operating a diode-pumped infrared laser, comprising:
using as a gain medium in the diode pumped laser a gain medium co-doped with co-dopant ions that make the gain medium resistant to external ionizing radiation, wherein a peak intensity of internal infrared radiation is greater than about 0.01 GWatts/cm$^2$ within the gain medium.

42. The method of claim 41 wherein the concentration in the gain medium of the co-dopant ions is sufficient to reduce a rate of degradation of the gain medium from infrared radiation by a factor two or more compared to the same or a substantially similar gain medium without the co-dopant ions.

43. The method of claim 41 wherein the gain medium is a solid-state material.

44. The method of claim 41 wherein the gain medium is a fiber, whereby the laser is a fiber laser.

45. The method of claim 41 wherein the solid-state material is a crystalline material.

46. The method of claim 41 wherein the gain medium is a fluoride crystal or an oxide crystal.

47. The method of claim 41 wherein the gain medium is a garnet.

48. The method of claim 41 wherein the gain medium is selected from the group of yttrium aluminum garnet (YAG), gadolinium gallium garnet (GGG), gadolinium scandium gallium garnet (GSGG), and yttrium scandium gallium garnet (YSGG).

49. The method of claim 41, wherein the gain medium is YAG.

50. The method of claim 41 wherein the gain medium is Tm:Ho:YAG, Yb:YAG, Nd:YAG or Er:YAG.

51. The method of claim 41 The laser of claim 1 wherein the gain medium is Nd:YVO$_4$ or Nd:YALO.

52. The method of claim 41 wherein the gain medium is Nd:YAG.

53. The method of claim 41 wherein the co-dopant ions are $Cr^{3+}$ ions or $Ce^{3+}$ ions.

54. The method of claim 53 wherein the co-dopant ions are present in the gain medium at a doping level of between about 0.01% and about 5%.

55. The method of claim 54 wherein the co-dopant ions are present in the gain medium at a doping level of between about 0.5% and about 1%.

56. The method of claim 41 wherein the laser includes means for frequency conversion of stimulated radiation from the gain medium.

57. The method of claim 56 wherein the means for frequency conversion generates higher harmonics of the stimulated radiation from the gain medium.

58. The method of claim 57 wherein the laser is a frequency tripled laser.

59. The method of claim 41 wherein the laser is configured to have low noise.

60. The method of claim 41 wherein a peak intensity of internal infrared radiation is greater than about 0.1 GWatts/cm$^2$ within the gain medium.

61. The method of claim 41 wherein the laser is Q-switched laser.

62. The method of claim 61 wherein the Q-switched laser is a low-noise Q-switched laser.

63. The method of claim 62 wherein the laser is an actively Q-switched laser.

64. The method of claim 41 wherein the laser can operate at more than about 5 times a threshold pump intensity.

65. A laser amplifier, comprising having a gain medium containing co-dopant ions that make the gain medium resistant to ionizing radiation, wherein a peak intensity of internal infrared radiation within the gain medium is greater than about 0.01 Gwatts/cm$^2$.

66. The laser of claim 12, further comprising a source of pumping radiation adapted to provide pumping radiation to the gain medium, wherein the pumping radiation has a wavelength of about 808 nm or about 880 nm.

67. The method of claim 36 wherein the gain medium is pumped with pumping radiation having a wavelength of about 808 nm or about 880 nm.

68. The method of claim 52, further comprising pumping the gain medium with pumping radiation having a wavelength of about 808 nm or about 880 nm.

* * * * *